(12) United States Patent
Völkel

(10) Patent No.: US 6,643,583 B2
(45) Date of Patent: Nov. 4, 2003

(54) METHOD FOR DISPLAYING A ROAD MAP IN AN AUTOMOTIVE VEHICLE

(75) Inventor: Andreas Völkel, Braunfels (DE)

(73) Assignee: Siemens Aktiengesellschaft, Munich (DE)

(*) Notice: Subject to any disclaimer, the term of this patent is extended or adjusted under 35 U.S.C. 154(b) by 0 days.

(21) Appl. No.: 10/073,351

(22) Filed: Feb. 13, 2002

(65) Prior Publication Data

US 2002/0123842 A1 Sep. 5, 2002

(30) Foreign Application Priority Data

Feb. 13, 2001 (EP) .............................. 01103318

(51) Int. Cl.$^7$ ............................................. G01C 21/32
(52) U.S. Cl. ................ 701/208; 701/200; 701/211; 701/212; 340/990; 340/995.1
(58) Field of Search ................................ 701/200, 208, 701/211, 212, 214; 340/990, 995, 995.1

(56) References Cited

U.S. PATENT DOCUMENTS

| 5,745,866 A | 4/1998 | Steiner .................... 701/200 |
| 5,793,310 A | 8/1998 | Watanabe et al. ........... 340/995 |
| 5,936,631 A | 8/1999 | Yano et al. ................. 345/428 |

*Primary Examiner*—Gertrude Arthur
(74) *Attorney, Agent, or Firm*—Morrison & Foerster LLP

(57) ABSTRACT

In an automotive vehicle a road map is displayed that features an indicator of the actual vehicle orientation and position. Such orientation and position are on a long term basis maintained steady with respect to a display field. In particular, a geographical window is set up regarding actual movements of the vehicle. It is checked whether the vehicle remains inside or outside of the window. If inside, the movements are displayed while at least partially suppressing the maintaining. If outside, the movements are displayed while substantially upholding such maintaining.

16 Claims, 3 Drawing Sheets

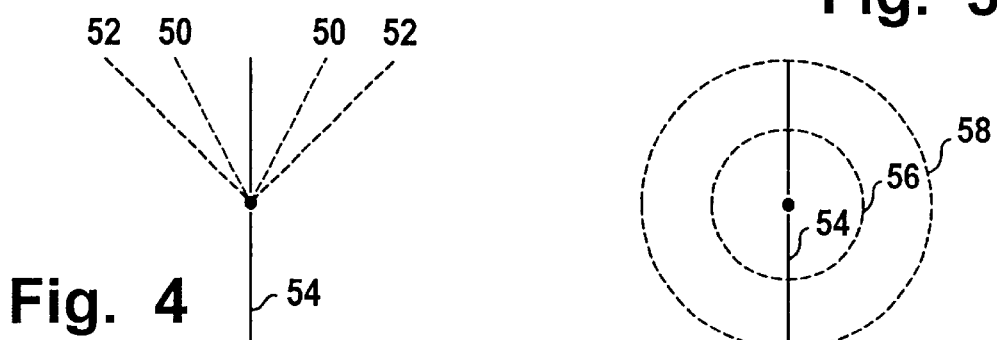
Fig. 4
Fig. 5
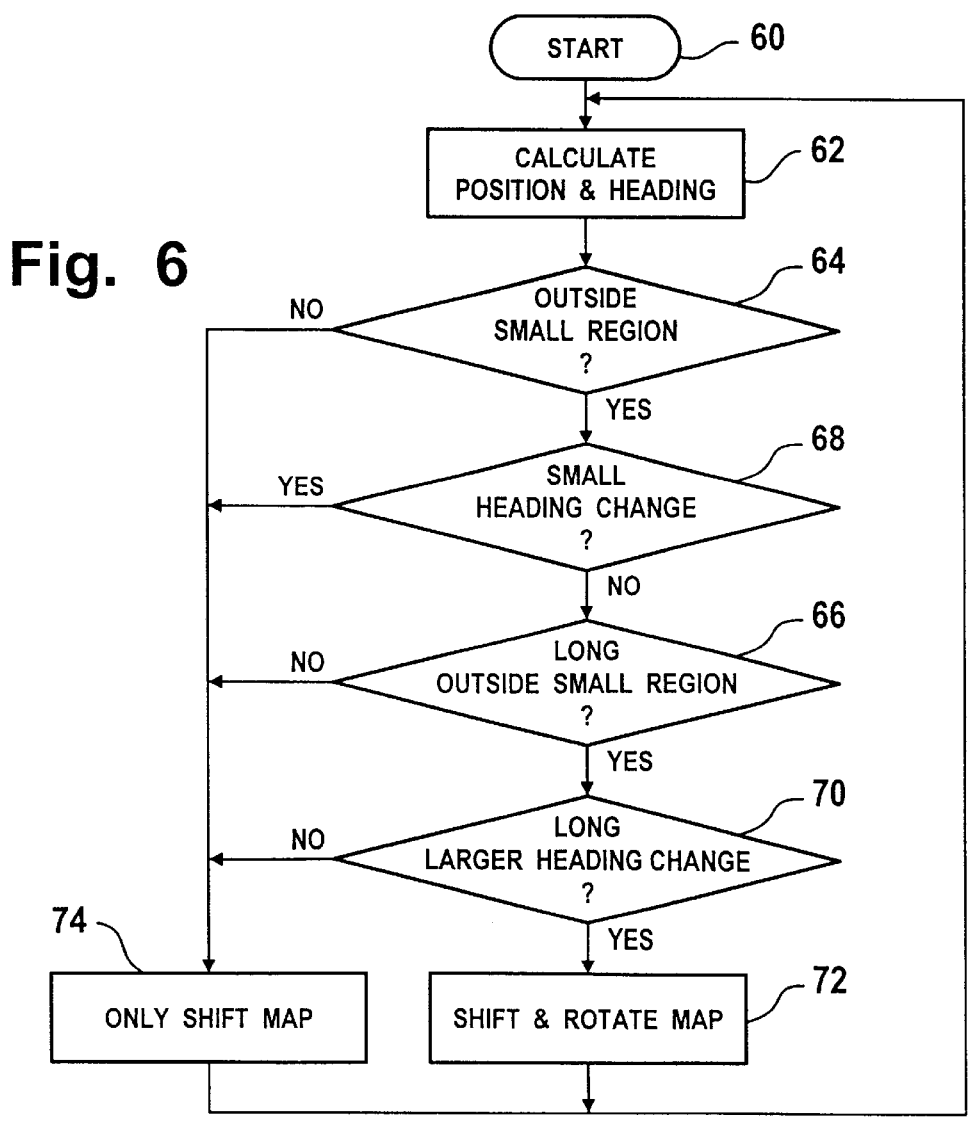
Fig. 6

METHOD FOR DISPLAYING A ROAD MAP IN AN AUTOMOTIVE VEHICLE

CLAIM FOR PRIORITY A1

This application claims priority to Application No. EP 01103318.0 which was published in the English language on Feb. 13, 2001.

TECHNICAL FIELD OF THE INVENTION

The invention relates to a method for an automotive vehicle to display a road map, and in particular, to display a road map that features an instantaneous signal of the actual vehicle orientation and position while maintaining the orientation and position on a long term basis steady with respect to a display field.

BACKGROUND OF THE INVENTION

Standard vehicle navigation systems typically include an arrangement for a map that will display various aspects of a planned route, such as a complete or partial road network in a region around the actual position of the vehicle. These same systems typically highlight the route that is to be followed according to the planning by the system. An elementary display system will display the map in a stationary manner, for example, indication north in the "up" direction. A more advanced system may include a dynamic display, wherein the direction instantaneously followed by the vehicle will always be in the "up" direction.

Under normal driving conditions the display of the vehicle in the "up" direction will cause far too many rotations of the map. This will even apply when a certain averaging is effected of the instantaneous curves that are being followed. In the case of the vehicle following a route that is partially curved, but on the whole more or less straight, many of the rotations are superfluous and distracting to the driver. The above problem will likewise occur when the route being followed is displayed, without a route planning feature being present or active.

SUMMARY OF THE INVENTION

The present invention seeks to restrict the amount and/or number of rotations in displaying a map to prevent distracting the driver and or detracting his attention from other incidents that could warrant immediate action.

According to one embodiment of the invention, there is a method for setting up a geographical window regarding actual movements of the vehicle, and checking whether the vehicle remains inside or outside the window. If the vehicle remains inside the window, displaying the movements while at least partially suppressing the orientation. If outside the window, displaying the movements while substantially upholding the orientation. Such will allow for a more pleasant display mode that will nevertheless present a user with adequate and easy-to-understand information regarding the vehicle position, and as such will improve the ergonomic performance of the display subsystem.

In a preferred embodiment of the invention, the window has a first angular size. Small changes in the orientation or heading of the vehicle will cause little necessity for changing the display.

In another preferred embodiment of the invention, the window has a first smaller angular size wherein maintaining the orientation is fully suppressed, and a second larger angular size wherein maintaining the orientation is temporarily attenuated. Such temporarily attenuating may imply a low-pass filtering of the changes, or generally, various operations to be executed in the time domain.

Alternatively, the temporarily attenuating may imply a full suppressing of the angular change during a predetermined period of time, but thereafter allowing a filtered change of the map orientation.

Advantageously, such window has a first linear size. Small movements in the position of the vehicle will cause little necessity for changing the display.

Preferably, such window has a first smaller linear size wherein maintaining the position is fully suppressed, and a second larger angular size wherein maintaining the position is temporarily attenuated. Such temporarily attenuating may again imply a low-pass filtering of the changes, or generally, various operations to be executed in the time domain. Again, the temporary attenuating may alternatively imply a full suppressing of the linear change during a predetermined period of time, but thereafter allowing a filtered change of the map position.

In another preferred embodiment of the invention, the method includes determining long-term values for shift and rotation of the vehicle position with respect to a geography, effecting such maintaining with respect to such long-term values, while suppressing the maintaining with respect to discrepancies between actual vehicle position and orientation with respect to such long-term values. This invention will under various circumstances produce a computationally and/or ergonomically superior solution.

Another embodiment of the invention relates to a vehicle route display system arranged for implementing a method for displaying, in an automotive vehicle, a road map including actual vehicle orientation and position which on a long term basis are maintained steady and on a short time basis selectively maintained under control of checking vehicle movements versus a window, and to a vehicle provided with such route display system.

BRIEF DESCRIPTION OF THE INVENTION

These and further aspects and advantages of the invention will be discussed more in detail hereinafter with reference to the disclosure of preferred embodiments, and in particular with reference to the appended Figures that show:

FIG. 4 is an embodiment of the angular control limits.

FIG. 5 is an embodiment of the spatial control limits.

FIG. 6 is a flow chart of the control operation.

DETAILED DESCRIPTION OF THE PREFERRED EMBODIMENTS

Figure 1:
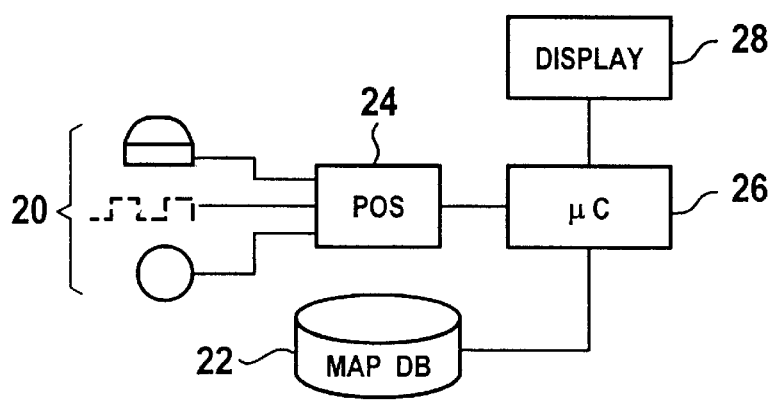
FIG. 1 is an exemplary functional block diagram of a navigation system.

FIG. 1 illustrates a functional block diagram of a vehicle navigation system. Item 20 represents various absolute or relative position sensors, that may be based on roadside beacons, wheel sensors, GPS, etc. The input signals received will allow subsystem 24 to calculate an actual position and orientation of the vehicle. Block 22 has a map database that is accessed by microcontroller 26 which also receives the actual vehicle position data from subsystem 24.

Through matching the position with the map, an on-map position with regard to a road will result, together with an actual direction of the vehicle in one of the two directions along that road. In principle, off-road positions are feasible, but such will be ignored hereinafter as not being fundamental to the present invention. Optionally, block 26 may include a vehicle guidance organization, through providing a calculated route to a destination, or including suggestions such as regarding instantaneous adversities connected with certain routes or parts thereof. The road map together with the instantaneous position of the vehicle will now be displayed on display 28.

Figure 2:
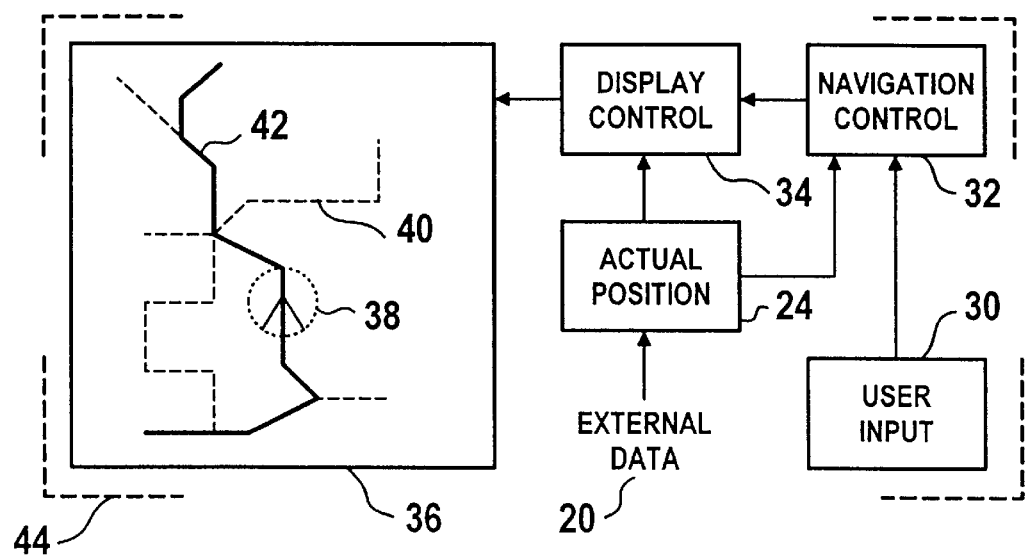
FIG. 2 is an exemplary block diagram linking the navigation system to the map display.

FIG. 2 illustrates a block diagram linking the navigation system to the map display. External data 20 will yield an actual position in block 24 (same numerals as in FIG. 1). User request input 30 together with actual position will allow navigation control in block 32 to calculate a target route. This will provide information to display controller 34 that also receives actual position and orientation from block 24. Display field 36 is generally rectangular, although this is not a restriction, and displays the target route as an uninterrupted line 42, together with a representation of the instantaneous position and orientation of the vehicle 38. Generally, this will have some orientation indicator in the form of an arrow or the like.

Additionally, relevant roads have been indicated in the form of interrupted lines 40, but other types of relative highlighting of certain roads with respect to others are equally feasible. The whole system is arranged within a motor vehicle that has been succinctly indicated by the corners 44 of a rectangle.

Prior art systems will typically display the vehicle position and orientation always in the same manner. Without express or implied limitation, the display has an upward orientation, and the position is at some 40% from the bottom, although other values are feasible. It should be clear, in particular when considering FIG. 3 hereinafter, that maintaining the vehicle in the same screen position often leads to many large and instantaneous jumps in the display, which can be distracting to the viewer. This also applies when the vehicle motion id subjected to time-based filtering for suppressing high-frequency components thereof.

Figure 3:
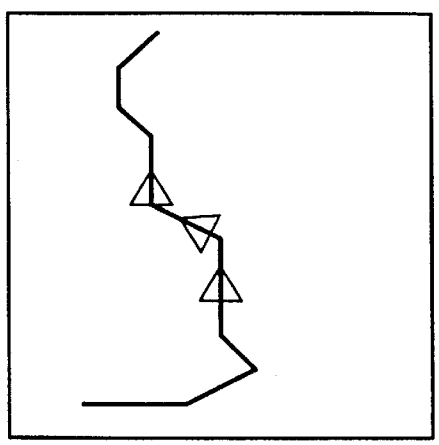
FIG. 3 is a detailed map display with travelling display of the vehicle position.

FIG. 3 illustrates a detailed map display with a travelling representation of the vehicle position, according to the target route displayed in FIG. 2, but maintains the display field in a fully stationary position. Doing such would on a small scale be acceptable, but on a large scale is not. Moreover, there are two aspects of the maintaining: firstly, keeping the map position stationary, and secondly, keeping the map orientation stationary, but shifting the map position. In many cases map shifting is allowable, but maintaining the map orientation is not necessary. In fact, in most cases the coordinates of the vehicle on the map scale would change quite slowly, whereas the orientation may readily change by 90° within a second. Accordingly, the preferred embodiment of the present invention is to let the map shift more or less exactly according to the position of the vehicle, while partially suppressing the rotations.

FIG. 4 illustrates an embodiment of the angular control limits for use with effecting such suppressing. The actual instantaneous direction of motion of the vehicle has been indicated by line 54. There is a first range of small changes in the orientation of the vehicle given by angle 50, which in this case is +/−30°. Furthermore, there is a second range of larger changes in the orientation of the vehicle given by angle 52, which in this case is +/−45°.

FIG. 5 likewise illustrates an embodiment of the spatial control limits. The actual instantaneous direction of motion has again been indicated by line 54. There is a first range of small changes in the position of the vehicle given by circle 56. The size of this circle may correspond to an average distance covered by the vehicle in ½ minute, such as 800 meters on a highway. The size of the circular window may even be controlled by the average vehicle speed during the last few minutes. Furthermore, there is a second range of larger changes in the position of the vehicle given by circle 58, which in this embodiment is twice as large as circle 56. Another possible shape for these windows may be square instead of circular.

FIG. 6 illustrates a first flow chart of the display control operation. In block 60, the operation starts and necessary hardware and software facilities are assigned. In block 62, the actual position and heading of the vehicle are determined. In block 64, the system checks whether the vehicle is outside region 56 of FIG. 5, as relative to the last time when such had been determined. Of course, initially the answer is no, whereupon the system goes to block 74, wherein the map display is shifted so as to represent the changing position of the vehicle. If yes, in block 68, the system determines whether the vehicle heading has only changed within small angle 50 in FIG. 5. If no, in block 68, the system in block 66 determines whether the vehicle has been in region 58 long enough, such as for longer than one minute. If yes, however, the system still goes to block 74. If yes, the system goes to block 70. In block 70, the system determines whether the vehicle has been within angle 52 long enough, such as for longer than one half minute. If no, the system still goes to block 74. If yes, however, the system goes to block 72, wherein, next to the shifting of the map, also the rotating of the map will be in principle allowed. This will also set new boundaries for the windows regarding angles and position. After updating of the map display, the system will return to block 62 for executing a next turn of the loop. If necessary, a certain waiting time may be implemented for each turn of the loop.

The logic of the decisions in FIG. 6 may be amended to some extent. For example, blocks 66 and 68 may be arranged in an OR-fashion, so that one of the two give an output to the left for controlling a transition to block 72. The same may be valid for the two blocks 64 and 68, so that one of the two give an "outside" answer for controlling a transition to the associated block 66, 70, respectively.

The arrangement in FIG. 6 has been simplified, such as by not showing terminating of the operation, such as when the vehicle power is shut off. Furthermore, the arrangement of FIG. 6 has been set up with the understanding that an excess of the vehicle movement outside angle 52 or outside region 58 will immediately control a transition to block 72.

Figure 7:
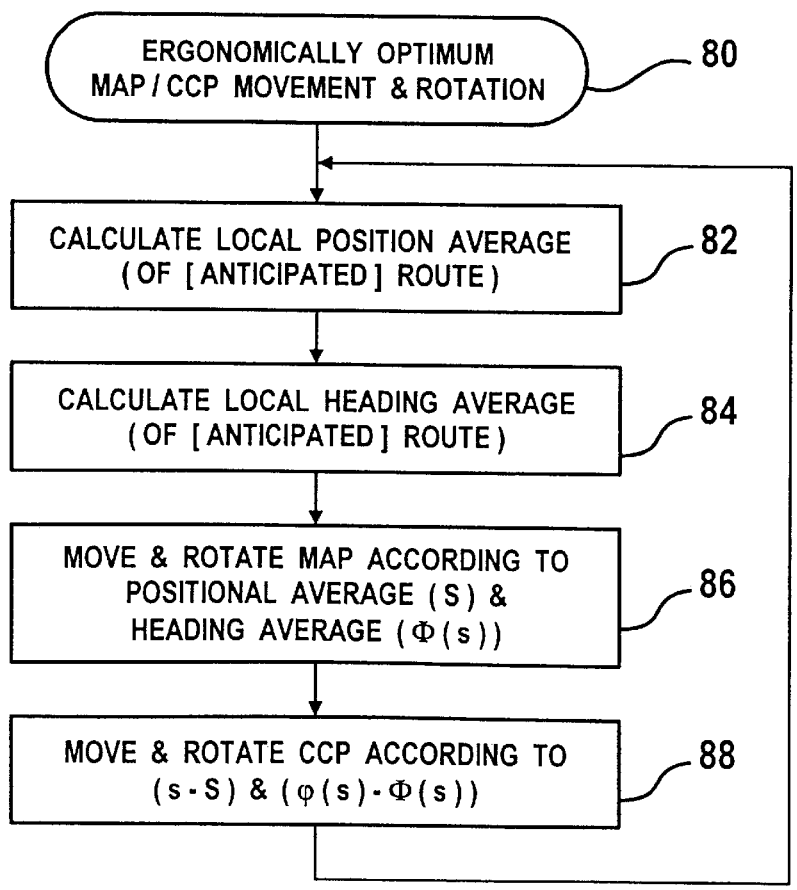
FIG. 7 is another exemplary flow chart of the control operation.

FIG. 7 illustrates another flow chart of the control operation. Herein, the abbreviation CCP means Current Car Position indicator. In block 80, the procedure ergonomically optimum map/CCP movement and rotation is started. In block 82, the local positional average of the route is calculated. In a more sophisticated embodiment, this will also include the anticipated route. Next, in block 84, the local heading average of the route is calculated. In a more sophisticated embodiment, this will also include the anticipated route. The anticipation may be extrapolated from actual position of the vehicle.

Another implementation would include such anticipation on the basis of the planned route that has been presented to the driver based on the driver's request for route planning and/or other data. Next, in block 86, the map is moved and rotated according to the positional average S and the heading average 0(s), wherein s is the instantaneous position. Finally, in block 88, the indicator CCP is moved and rotated according to the difference between the actual position s and positional average S, and also, according to the difference between the actual heading (p(s) and the heading average (D(s). Subsequently, the system returns to block 82.

Figure 8:
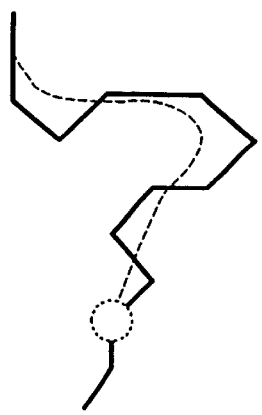
FIG. 8 is an exemplary diagram of a vehicle route subjected to an averaging operation.

FIG. 8 illustrates a diagram of a vehicle route subjected to an averaging operation. This usually implies that a more smooth curve (interrupted line) is derived from a route that is built up from often straight sections.

Figure 9:
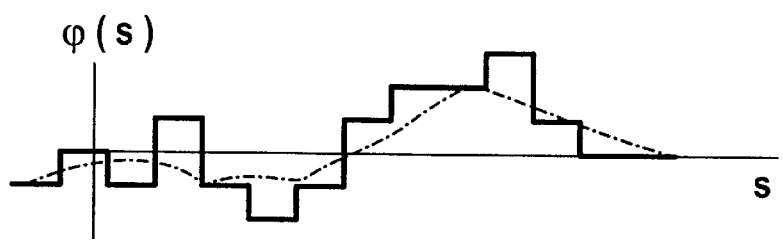
FIG. 9 is an exemplary diagram of the vehicle angular position subjected to an averaging operation.

FIG. 9 illustrates a diagram of the vehicle angular position subjected to an averaging operation. This may again imply that a smoother curve (interrupted line) is derived from a route which is built up from often straight sections.

Various further advantageous features of the invention and its embodiments would include the following. Long-term shifts and rotations of the vehicle position that have similar character, such as those that are more or less in the same direction, will be represented by moving the map, whereas differential shifts and rotations will be represented by moving the symbol used for the vehicle. This may be implemented by calculating a running average of position and orientation of the vehicle. The average is represented by the movements of the map. The discrepancy between actual values and average is represented by differences between the vehicle symbol position and orientation and the map representation.

The intervals for determining the average position may be set, either by the user, or by the system. An example for the setting by the system may be relative to the size of the actual map which itself may depend on the type of route that is being followed and/or the remaining distance to the destination. The average may for example be 20% of the map height. The interval for calculating the average value may be based both on the route that will be followed, as well as on the route that has been followed already. If there is no planned route available, the averaging goes until the next route point where a splitting is present. In the above cases the route axis has developed to a fixed average curve.

The map orientation may be changed smoothly or seamless. On the other hand, the rotation may be executed in a step-wise manner as well. In that case, the steps will be subjected to an upper bound. If a larger step were necessary, it will be executed in successive smaller steps that are separated in time, such as by a fixed time interval of e.g., 3 seconds. The result of the invention will generally be a quieter overall image, wherein the map will execute smooth motions, whereas the vehicle symbol will execute differential movements and rotations.

A further advantage is to maintain the vehicle symbol in a restricted region of the display, such as in the lower third of the display field, thereby keeping the main part of the map display in front of the vehicle.

While the above described embodiments of the invention are the preferred ones, it is apparent to those skilled in the art that many other changes and modifications may be made, without departing from the invention in its broader aspects. Therefore the intentions of the claims is to cover such changes and modifications, falling within the true spirit and scope of the invention.

What is claimed is:

1. A method for displaying a road map in a vehicle, comprising:
   displaying an indicator of the vehicle orientation and position while maintaining the orientation and position with respect to a display field;
   setting up a geographical window to represent actual movements of the vehicle; and
   checking whether the indicator remains inside or outside of the window, wherein
      if the indicator is inside the window, displaying the movements while at least partially suppressing the orientation, and
      if the indicator is outside of or partially outside of the window, displaying the movements while substantially upholding the orientation.

2. A method as claimed in claim 1, wherein the window has a first angular size.

3. A method as claimed in claim 1, wherein the window has a first linear size.

4. A method as claimed in claim 1, wherein the window is set up regarding actual movements that include anticipated movements of the vehicle.

5. A method as claimed in claim 1, wherein a change in map orientation being effected in a smooth rotation.

6. A method for displaying a road map in a vehicle, comprising:
   displaying an indicator of the vehicle orientation and position while maintaining the orientation and position with respect to a display field;
   setting up a geographical window to represent actual movements of the vehicle; and
   checking whether the indicator remains inside or outside of the window, wherein
      if the indicator is inside the window, displaying the movements while at least partially suppressing the orientation,
      if the indicator is outside of or partially outside of the window, displaying the movements while substantially upholding the orientation,
      the window has a first angular size, and
      the window has a first angular size wherein the shifting of the orientation is fully suppressed, and a second angular size wherein shifting of the orientation is temporarily attenuated.

7. A method for displaying a road map in a vehicle, comprising:
   displaying an indicator of the vehicle orientation and position while maintaining the orientation and position with respect to a display field;
   setting up a geographical window to represent actual movements of the vehicle; and
   checking whether the indicator remains inside or outside of the window, wherein
      if the indicator is inside the window, displaying the movements while at least partially suppressing the orientation,
      if the indicator is outside of or partially outside of the window, displaying the movements while substantially upholding the orientation
      the window has a first linear size, and
      the window has a first linear size wherein shifting of the orientation is fully suppressed, and a second angular size wherein shifting of the orientation is temporarily attenuated.

8. A method for displaying a road map in a vehicle, comprising:

displaying an indicator of the vehicle orientation and position while maintaining the orientation and position on a display field;

determining long-term values for shift and rotation of the vehicle position with respect to a geography; and maintaining the long-term values, while suppressing the maintaining of discrepancies between the vehicle position and orientation with respect to such long-term values.

9. A method for displaying a road map in a vehicle, comprising:

displaying an indicator of the vehicle orientation and position while maintaining the orientation and position on a display field;

determining long-term values for shift and rotation of the vehicle position with respect to a geography; and maintaining the long-term values, while suppressing the maintaining of discrepancies between the vehicle position and orientation with respect to such long-term values, wherein long-term values are determined for an average position of the vehicle, and the average is determined for an interval in time or space that has an adjustable size.

10. A method as claimed in claim 9, wherein the interval includes a route that has been followed as well as a route that is intended to be followed by the vehicle.

11. A method as claimed in claim 10, wherein the route to be followed under absence of an active route planning feature is bounded at a next possible route splitting location.

12. A method for displaying a road map in a vehicle, comprising:

displaying an indicator of the vehicle orientation and position while maintaining the orientation and position with respect to a display field;

setting up a geographical window to represent actual movements of the vehicle; and checking whether the indicator remains inside or outside of the window, wherein
  if the indicator is inside the window, displaying the movements while at least partially suppressing the orientation, and
  if the indicator is outside of or partially outside of the window, displaying the movements while substantially upholding the orientation, wherein map orientation is restricted to an upper bound, and a change in the map orientation is split into a sequence of time-spaced smaller steps that are each subject to such upper bound.

13. A vehicle route display system, comprising:

a road map display unit to display an indicator of the vehicle orientation and position, where the orientation and position are maintained with respect to a display field;

a geographical window set-up unit to set up a geographical window regarding actual movements of the vehicle; and a check unit to check whether the indicator remains inside or outside of the window, and
  if the indicator remains inside of the window, outputting a suppress signal to at least partially suppress displaying the orientation movement, and
  if the indicator remains outside of the window, terminating the suppress signal to substantially upholding the orientation.

14. A vehicle route display system, comprising:

a road map display unit to display an indicator of the vehicle orientation and position, where the orientation and position are maintained with respect to a display field;

a determining unit to determine long-term values for shift and rotation of the vehicle position with respect to a geography, and outputting a first control for effecting such maintaining with respect to the long-term values; and a second control unit to suppress such maintaining with respect to discrepancies between actual vehicle position and orientation with respect to the long-term values.

15. A vehicle provided with a route display system, the route display system comprising:

a road map display unit to display an indicator of the vehicle orientation and position, where the orientation and position are maintained with respect to a display field;

a geographical window set-up unit to set up a geographical window regarding actual movements of the vehicle; and a check unit to check whether the indicator remains inside or outside of the window, and
  if the indicator remains inside of the window, outputting a suppress signal to at least partially suppress displaying the orientation movement, and
  if the indicator remains outside of the window, terminating the suppress signal to substantially upholding the orientation.

16. A vehicle provided with a route display system, the route display system comprising:

a road map display unit to display an indicator of the vehicle orientation and position, where the orientation and position are maintained with respect to a display field;

a determining unit to determine long-term values for shift and rotation of the vehicle position with respect to a geography, and outputting a first control for effecting such maintaining with respect to the long-term values; and a second control unit to suppress such maintaining with respect to discrepancies between actual vehicle position and orientation with respect to the long-term values.

* * * * *